No. 12,767 REISSUED MAR. 24, 1908.

T. V. BUCKWALTER.

ELECTRICALLY OPERATED BAGGAGE TRUCK.

APPLICATION FILED FEB. 19, 1908.

2 SHEETS—SHEET 1.

Witnesses:

R. H. R. Stitchel

Jos. G. Denny, Jr.

Inventor,

Tracy V. Buckwalter

By

Charles N. Butler

Atty

No. 12,767. REISSUED MAR. 24, 1908.

T. V. BUCKWALTER.

ELECTRICALLY OPERATED BAGGAGE TRUCK.

APPLICATION FILED FEB. 19, 1908.

2 SHEETS—SHEET 2.

Witnesses:

Robt. R. Ketchel

Jos. S. Denny Jr.

Inventor,

Tracy V. Buckwalter

By Charles N. Butler atty

UNITED STATES PATENT OFFICE.

TRACY V. BUCKWALTER, OF ALTOONA, PENNSYLVANIA.

ELECTRICALLY-OPERATED BAGGAGE-TRUCK.

No. 12,767. Specification of Reissued Letters Patent. Reissued Mar. 24, 1908.

Original No. 875,893, dated January 7, 1908, Serial No. 363,559. Application for reissue filed February 19, 1908. Serial No. 416,806.

*To all whom it may concern:*

Be it known that I, TRACY V. BUCKWALTER, a citizen of the United States, residing in the city of Altoona, county of Blair, and State of Pennsylvania, have invented certain Improvements in Electrically-Operated Baggage-Trucks, of which the following is a specification.

This invention is an electrically operated baggage truck designed to provide the greatest possible stability, to admit of ready operation in either direction from either end, to secure positive control of the operations, and to secure simplicity of construction.

The truck has knuckle axles providing four points of support. The four wheels are steered as a unit from each end. A motor carried by the truck acts through spur gearing and shafts to effect propulsion.

Figure 1:
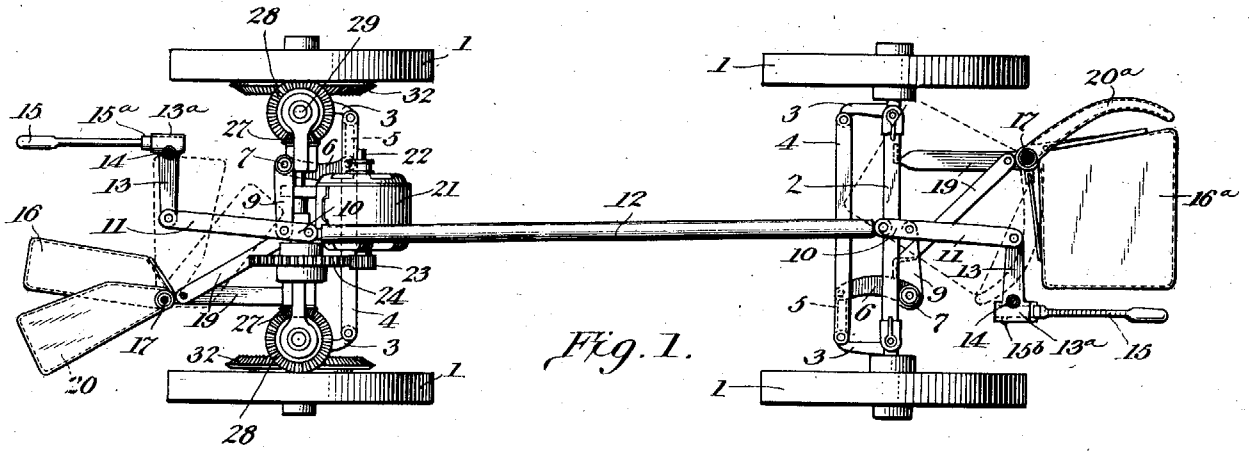
Figure 2:
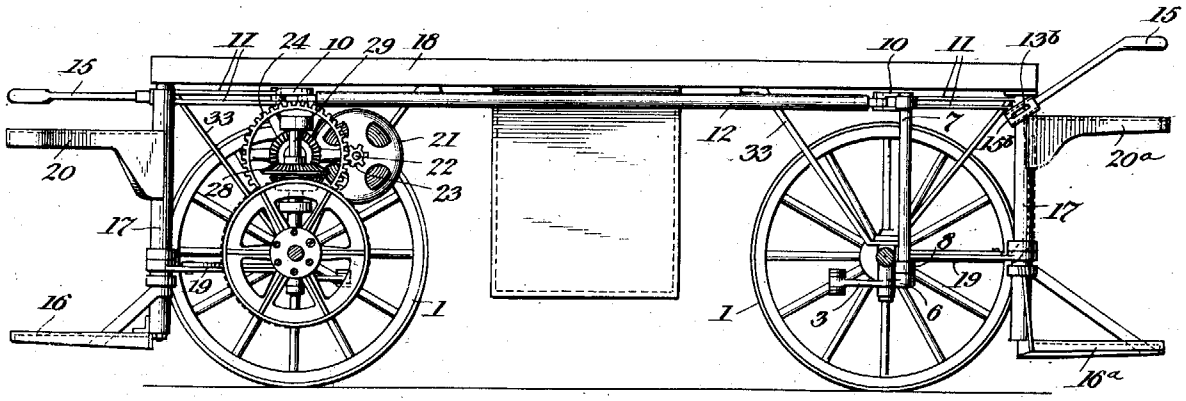
Figure 3:
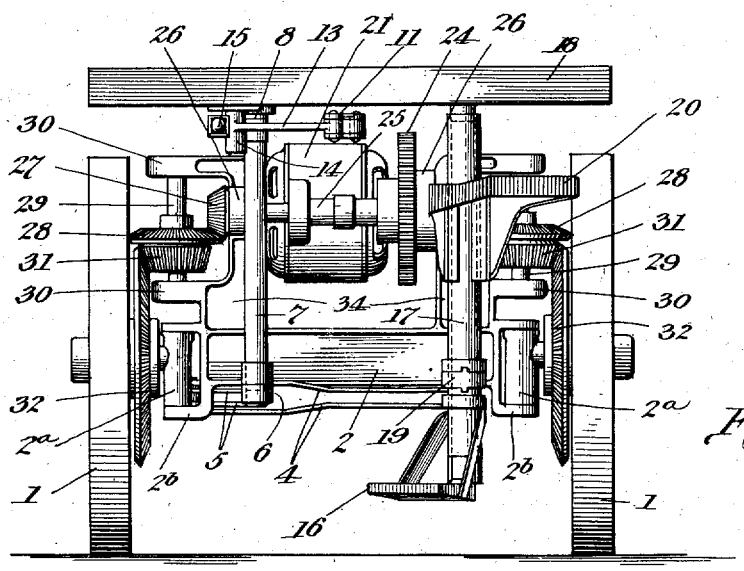
Figure 4:
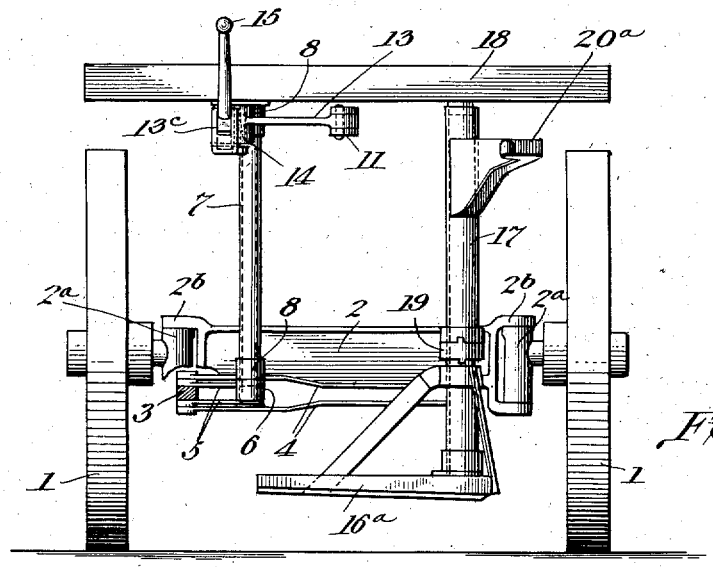

In the accompanying drawings, Figure 1 represents a plan view of a truck embodying my improvements, the platform being removed; Fig. 2 represents a side elevation of the same with the platform in place; Fig. 3 represents an end elevation, and Fig. 4 represents an elevation of the opposite end, parts being broken away for the purpose of illustration.

As illustrated, the heels 1 have the axles or beams 2 provided with joints comprising the knuckles $2^a$ pivoted to the bearings $2^b$ by which each wheel has a vertical axis of oscillation. Arms 3 are fixed to the respective knuckles and the arms of the respective axles are pivotally connected to the links 4. Links 5 are pivotally connected to the arms 3 and each link is pivotally connected to an arm 6 fixed to the lower end of a shaft 7 which is journaled in bearings 8. At the top of each shaft 7 is fixed an arm 9 pivotally connected to the arms 10 and 11 forming a connecting rod. A rod 12 is pivotally connected to each of the arms 10 by which, with the connected parts described, the wheels can be oscillated simultaneously on their vertical axes. Each arm 11 is pivotally connected to an arm 13 which is fulcrumed on a bearing 14. A handle 15 is connected with each arm 13, each handle having a head $15^a$ which is movable longitudinally in the socket $13^a$ of the arm. The sockets are provided with the slots $13^b$ which engage pins $15^b$ in the handles, and, with the open throats $13^c$, permit the handles to drop when drawn out.

It will be understood that when a handle is out of operation it is drawn out and dropped, while when it is in operation it is raised and thrust in. Each handle acts, through the mechanism described, to simultaneously oscillate all of the wheels so that the respective pairs are moved in opposite directions.

At each end of the truck is provided an operator's platform 16 or $16^a$ revolubly supported at the lower end of the post 17, the latter being carried by the baggage platform 18 and the braces 19 fixed to the axle corresponding thereto. Intermediate of the ends of each post is a rest 20 or $20^a$, the former serving as a seat and the latter as a leaning support for the operator. The rests, like the operator's platforms, are revoluble about the axes of the posts 17 so that they can be turned in out of the way when not in use.

The motor 21 is carried by one of the axles. On the motor shaft 22 is fixed a pinion 23 which engages a gear wheel 24 fixed on a shaft 25, the latter revolving in bearings 26. Fixed to the ends of the shaft 25 are the beveled pinions 27 which engage the beveled spur gears 28 fixed on the shafts 29, the latter being journaled in the bearings 30 of the frame struts 34. Each shaft 29 has fixed thereto a beveled pinion 31 which engages a beveled spur wheel 32 fixed to a wheel 1.

There is thus provided a structure or frame (comprising the axles or beams 2 and the platform 18 rigidly fixed thereto by the struts 33) which has the four relatively fixed points of support at the knuckle joints $2^a$, $2^b$, about which the respective wheels are simultaneously movable by each of the steering levers 15 acting through the steering mechanisms connecting them with the wheels.

Having described my invention, I claim:

1. A truck having four wheels each movable about a vertical axis, and means adapted to be operated at each end of said truck for simultaneously moving said wheels about said axes.

2. A truck having a pair of wheels at each end, a knuckle joint for each wheel, mechanism for connecting said wheels so that they are movable simultaneously on the axes of their respective joints, and a steering device at each end of said truck for operating said mechanism and simultaneously shifting the respective pairs of said wheels in opposite directions.

3. A truck having a frame with four relatively fixed points of support, wheels having pivotal connections with said frame at the respective points of support, mechanism connecting said wheels so that they are moved together about their respective pivotal connections, and a lever at each end of said truck for operating said mechanism.

4. A truck having a beam at each end thereof, a platform rigidly fixed to said beam, a pair of wheels having knuckle joint connections with each beam, an arm connected to each knuckle for oscillating a corresponding wheel, links connecting the arms of the respective pairs of wheels, a rock shaft at each end of said truck, an arm fixed to each rock shaft and connected to the corresponding pair of wheels, a second arm fixed to each rock shaft, and means for connecting and operating said last named arms together.

5. A truck having a beam, a pair of wheels having pivotal connections with said beam, an arm connected with each of said wheels so as to move it about its pivotal connection, a link connecting said arms, a rock shaft having an arm connected with the first named arms and link and a second arm for rocking it, a fulcrumed arm, means connecting said fulcrumed arm with the second arm of said rock shaft, and means for rocking said fulcrumed arm.

6. A truck having a beam, a pair of wheels having knuckle joint connections with said beam, a spur gear fixed to each wheel, a pair of pinions respectively engaging the respective spur gears, a pair of spur gears fixed to said pinions respectively, a revoluble shaft having pinions thereon which engage and revolve the last named spur gears, and a motor connected with and operating said shaft.

7. A truck having a baggage platform, a beam fixed to said platform, a pair of wheels having knuckle joint connections with said beam, a steering device and mechanism connecting it with said wheels, and an operator's platform and rest adjacent to said steering device.

8. In a truck, a handle, and a device connected to and operated by said handle, said handle being hinged and movable longitudinally with relation to said device.

In witness whereof, I have hereunto set my name this 6th day of February, A. D. 1908, in the presence of the subscribing witnesses.

TRACY V. BUCKWALTER.

Witnesses:

J. L. B. Buck,

P. H. Markley.